United States Patent [19]

Ito et al.

[11] Patent Number: 4,706,239

[45] Date of Patent: Nov. 10, 1987

[54] COMMUNICATIONS SATELLITE REPEATER

[75] Inventors: Yasuhiko Ito; Hideyuki Shinonaga, Saitama, both of Japan

[73] Assignee: Kokusai Denshin Denwa Co., Ltd., Tokyo, Japan

[21] Appl. No.: 810,144

[22] Filed: Dec. 18, 1985

[30] Foreign Application Priority Data

Dec. 24, 1984 [JP] Japan ............................... 59-271040

[51] Int. Cl.[4] ........................ H04Q 11/02; H04J 1/10; H04B 7/185
[52] U.S. Cl. ...................................... 370/57; 370/75; 370/123; 455/12
[58] Field of Search .................... 370/30, 57, 123, 75; 455/7, 12; 179/170 R, 170 C; 379/338, 339

[56] References Cited

U.S. PATENT DOCUMENTS 3,636,452 1/1972 Nuding ................................. 370/75
4,381,562 4/1983 Acampora ........................... 370/75
4,456,988 6/1984 Nakagome et al. ................. 370/75

FOREIGN PATENT DOCUMENTS 0149434 8/1984 Japan ................................. 370/75

Primary Examiner—Douglas W. Olms
Assistant Examiner—Frank M. Scutch, III
Attorney, Agent, or Firm—Armstrong, Nikaido, Marmelstein & Kubovcik

[57] ABSTRACT

A communications satellite repeater having input demultiplexers for demultiplexing input beams to a plurality of first channels each having a first bandwidth, switches for interconnecting each input channel to desired output channel on a channel by channel basis, amplifiers, and output multiplexers for multiplexing output channels to output beams is improved by the particular structure of the switch. The present switch (8) has filter banks (9) for providing a plurality of second channels each having a second bandwidth narrower than said first channels by dividing each of said first channels, which can also operate as bandwidth-variable filter banks by multiplexing the adjacent second channels, switches (10) coupled with said filter banks (9) to interconnect said second channels, and multiplexers (11) for multiplexing the second channels at the ouptut of said switches (10) to provide output channels. Thus, each transponder can interconnect a plurality of beams.

3 Claims, 22 Drawing Figures

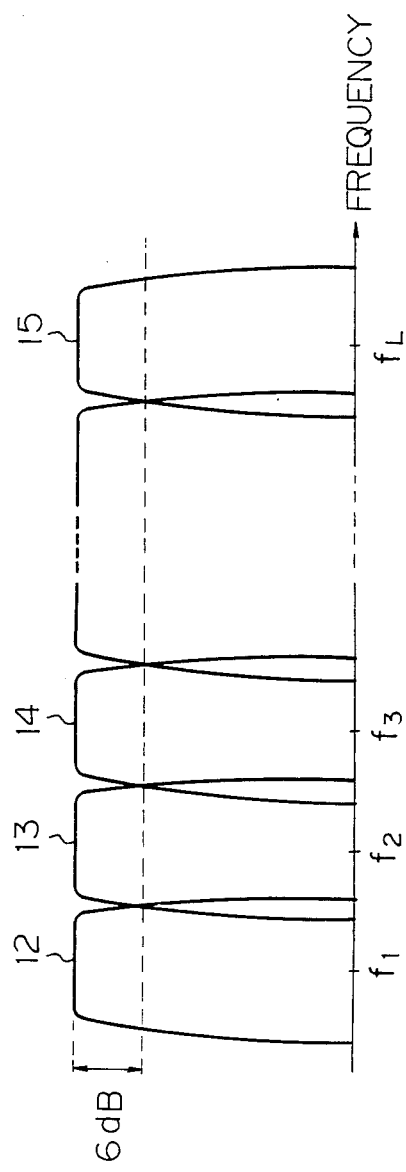

COMMUNICATIONS SATELLITE REPEATER

BACKGROUND OF THE INVENTION

The present invention relates to a communications satellite repeater, and more precisely to such type of repeater which is used in a multibeam communications satellite having the flexibility in interbeam connections.

It is considered a multibeam communications satellite in which the same frequency is reused a number of times by the use of a number of spot beams or by the use of orthogonal polarizations.

In the conventional multibeam communications satellite, the satellite communications band is divided into channels each having, as a basic unit, a broad-bandwidth in the order of 40 MHz and a transponder is assigned to each of the channels. The structure of the communications satellite repeater used in a case where the number of beams is N and the number of channels is M will be shown in FIG. 1, for example.

In FIG. 1, Numeral 1 designates a receive antenna, Numeral 2 designates a receiver for performing amplification and frequency conversion, Numeral 3 designates input demultiplexers for dividing input beams into a plurality of channels, Numeral 4 designates a switch interconnecting each input channel to the desired output channel on a channel by channel basis, Numeral 5 designates an amplifier, Numeral 6 designates output multiplexers for multiplexing output channels to output beams and Numeral 7 designates a transmit antenna. Although the switch 4 and the amplifier 5 are shown for the channel 1, those for the channels 2 through M are the same in structure.

However, the conventional satellite communications repeater of the above structure has had such drawbacks that since interbeam connections are made by switches on a channel by channel basis, it is necessary to establish different interbeam connections for each channel in order to enable an earth station in one beam to communicate with all the other earth stations in separate beams and, therefore, the number of channels must be increased as the number of beams increases, accordingly, the communications satellite loses the operational flexibility resulting in substantially lowered satellite capacity.

SUMMARY OF THE INVENTION

The present invention has been made to overcome the abovementioned drawbacks of the conventional communications satellite repeater and the principal object of the present invention is to realize a multibeam communications satellite which has a high degree of interbeam connectivity and which is capable of flexibly accommodating the demands for satellite communications.

The above and other objects are attained by a communications satellite repeater in which a satellite communications band is divided into a plurality of first channels each having a first bandwidth, transponders are assigned to each channel, and each channel is interconnected by switching means, wherein said switching means comprises filter banks for providing a plurality of second channels each having a second bandwidth narrower than said first bandwidth by dividing each of said first channels, which can also operate as bandwidth-variable filter banks by multiplexing the adjacent second channels, switches coupled with said filter banks to interconnect said second channels, and multiplexers for multiplexing the second channels at the output of said switches to provide output channels, whereby each transponder can interconnect a plurality of beams.

BRIEF DESCRIPTION OF THE DRAWINGS

The foregoing and other objects, features, and attendant advantages of the present invention will be appreciated as the same become better understood by means of the following description and accompanying drawings wherein;

FIG. 3 is curves between the amplitude (voltage) and frequency of a filter bank according to the present invention;

DESCRIPTION OF THE PREFERRED EMBODIMENTS

Figure 1:
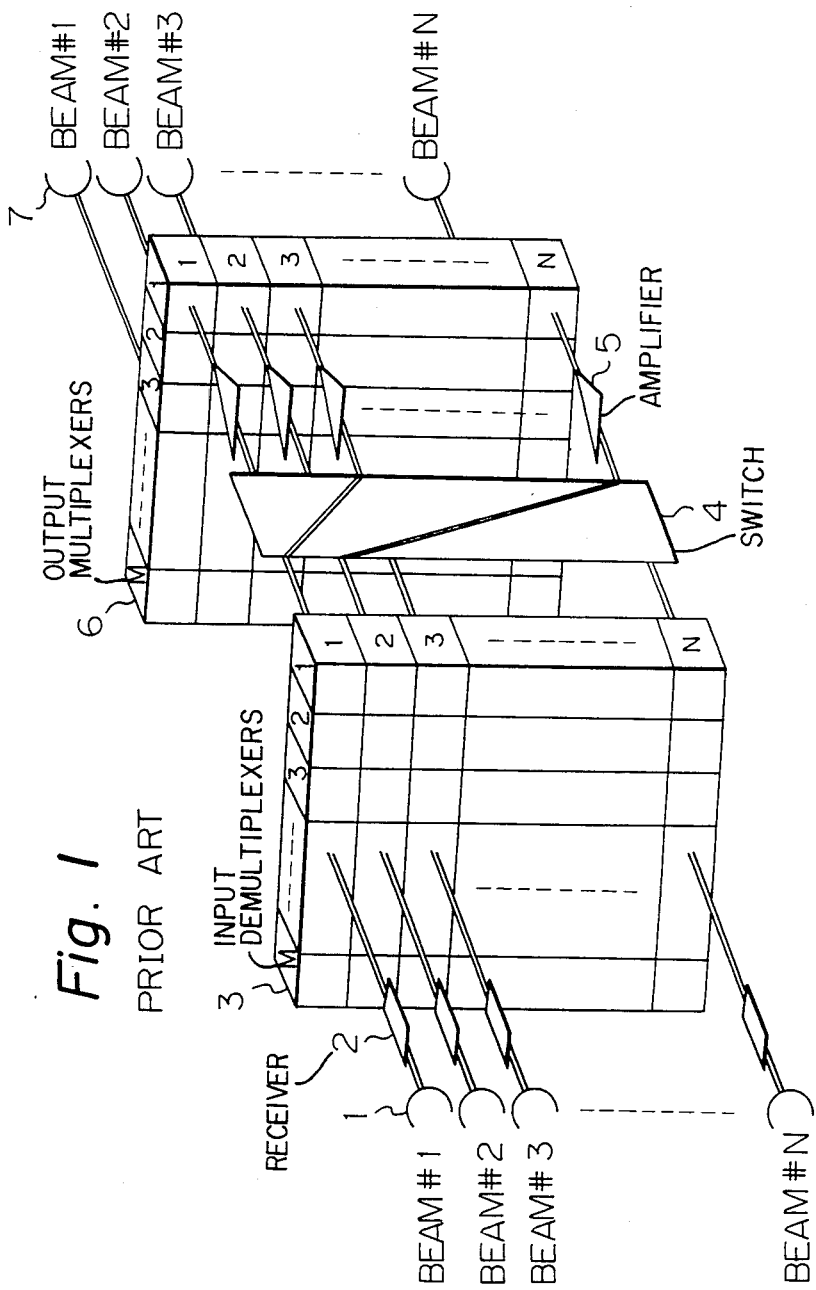
FIG. 1 is a diagrammatical view of a conventional communications satellite repeater.
Figure 2:
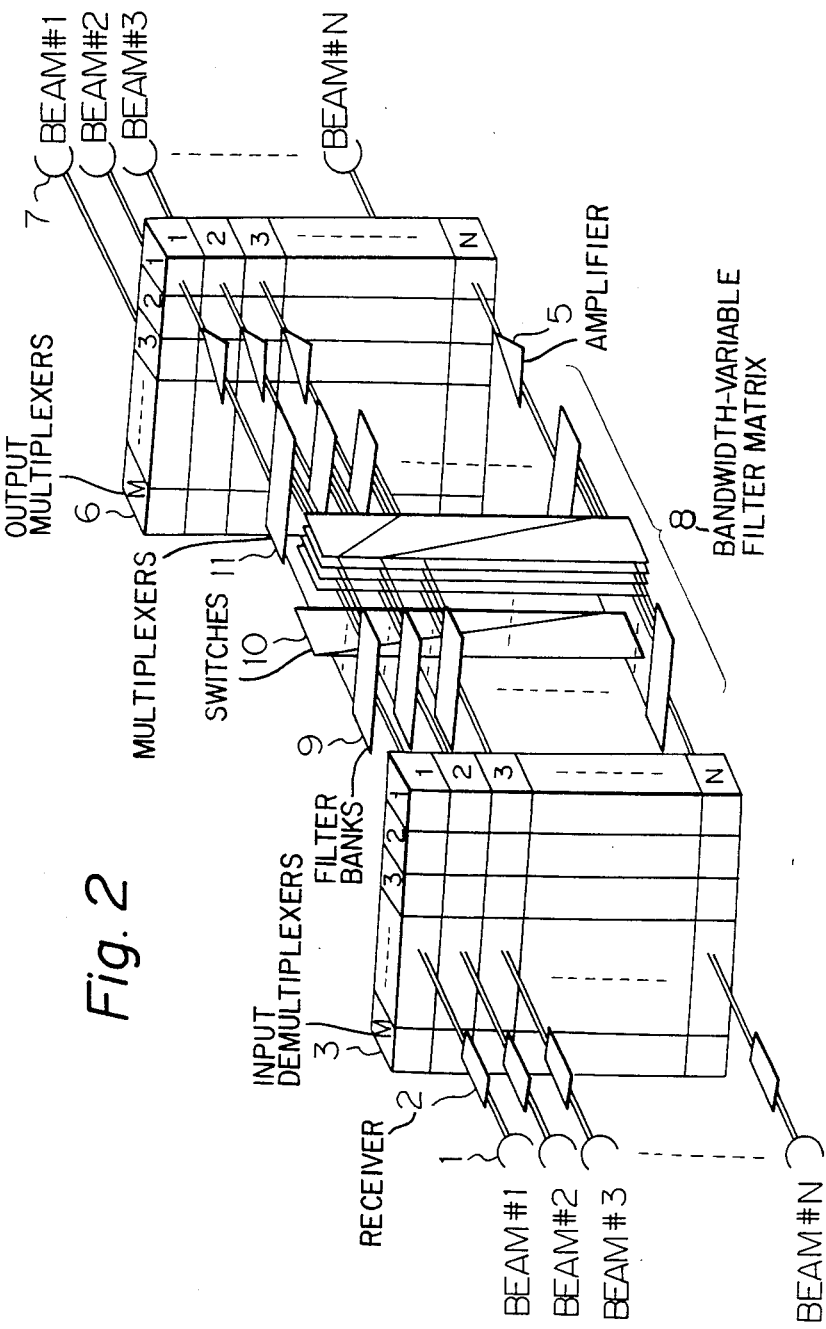
FIG. 2 is a diagrammatical view of a communications satellite repeater according to the present invention.

FIG. 2 shows an embodiment of a repeater for use in a multibeam communications satellite in which the number of beams is N (a natural number) and the number of channels is M (a natural number) and in which Numeral 1 designates a receive antenna, Numeral 2 designates a receiver, Numeral 3 designates input demultiplexers, Numeral 5 designates an amplifier, Numeral 6 designates output multiplexers, Numeral 7 designates a transmit antenna and Numeral 8 designates a bandwidth-variable filter matrix. As shown, the bandwidth-variable filter matrix 8 and the amplifier 5 are shown for the channel 1 only but those for the channels 2 through M are the same in structure.

The bandwidth-variable filter matrix 8 which is an important feature of the present invention is formed of filter banks 9, switches 10 and multiplexers 11, and enables each transponder to interconnect a plurality of beams by dividing each channel into small bands of a variety of widths with a basic bandwidth unit in the order of several MHz. The details of this filter matrix are as follows:

The filter bank 9 divides each channel into a plurality of channels of equal bandwidth in the order of several MHz and the amplitude (voltage) frequency characteristics of the filter bank which divides one channel into L narrow-band channels are, for example, shown in FIG. 3. In FIG. 3, Numerals 12, 13, 14 and 15 designate the amplitude frequency characteristics of the narrow-band channels 1, 2, 3, and L, respectively, and $f_1$, $f_2$, $f_3$, $f_L$ are the center frequencies of the narrow-band channels 1, 2, 3, and L, respectively. As shown in FIG. 3, the adjacent narrow-band channels in the filter bank 9 intersect one another at points where an amplitude of 6 dB attenuates and the phase is continuous at these points.

Figure 4A:
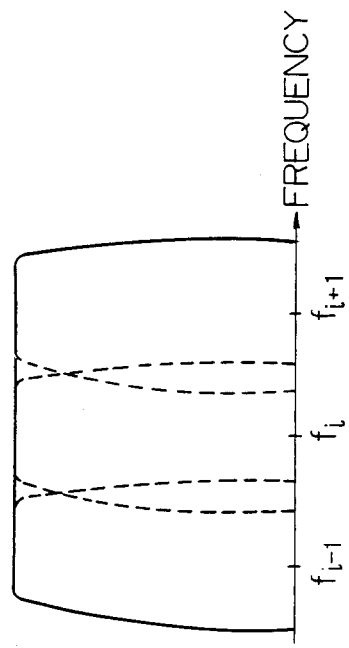
FIGS. 4a and 4b are curves between the amplitude and frequency of the filter bank when narrow-band channels adjacent to one another in the filter bank are multiplexed.
Figure 4B:
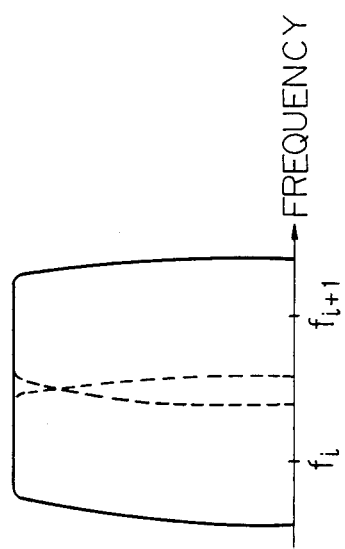

Assume that the adjacent narrow-band channels are to be multiplexed. For example, multiplexing the adjacent two or three narrow-band channels simply requires providing a channel whose bandwidth is 2 or 3 times that of the narrow-band channel, as shown in FIGS. 4(a) and 4(b). In FIG. 4, the amplitude frequency characteristics of the multiplexed narrow-band channels are also shown with broken lines. The multiplexing of such adjacent narrow-band channels is accomplished by multiplexing the outputs thereof. Accordingly, it is possible to realize a bandwidth-variable filter bank on the basis of the bandwidth of the narrow-band channel by multiplexing the outputs of any adjacent narrow-band channels in the filter bank. Such filter bank can be realized in a small size by using surface acoustic wave filters. Further, it is possible to keep the phase continuity required for the multiplexing of the narrow-band channels.

The bandwidth-variable filter matrix 8 divides each channel into a plurality of narrow-band channels of equal bandwidth by the filter banks 9, interconnects narrow-band channels by means of the switches 10, and multiplexes narrow-band channels by the multiplexers 11 to provide output channels. Thus, it enables each transponder to interconnect a plurality of beams. When it is necessary to have a bandwidth broader than that of the narrow-band channel, it is sufficient to simply set the interbeam connections of the required adjacent narrow-band channels the same.

Figure 5:
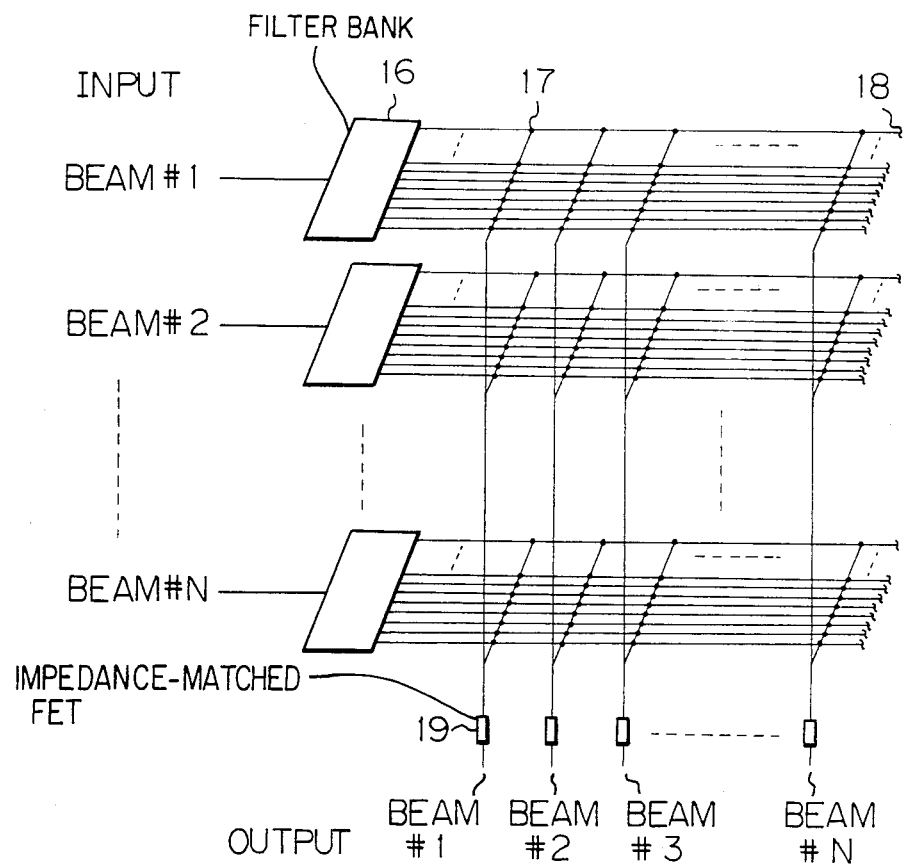
FIG. 5 is a view showing one embodiment of a bandwidth variable filter matrix according to the present invention.

Next, an embodiment for realizing the bandwidth-variable filter matrix will be described. An example of such a method is shown in FIG. 5 wherein Numeral 16 designates a filter bank employing surface acoustic wave filters which have interdigital electrodes on a piezo-electric substrate. Numeral 17 designates an impendance-matched dual gate FET switch, Numeral 18 designates a terminator and Numeral 19 designates an impedance-matched FET for multiplexing.

In the FIG. 5 embodiment, the interbeam connections of the narrow-band channels are performed by the ON/OFF operations of the impendance-matched dual gate FET switch 17. When a bandwidth larger than the narrow-band channel is required, it is sufficient to turn on the switches 17 of the adjacent narrow-band channels to be multiplexed. Since this embodiment is basically a crossbar structure, it has the broadcasting function of distributing the output signals of one narrow-band channel to a plurality of beams. Further, the dual gate FET switch has the advantage of amplifying the signals when the switch is ON.

Figure 6A:
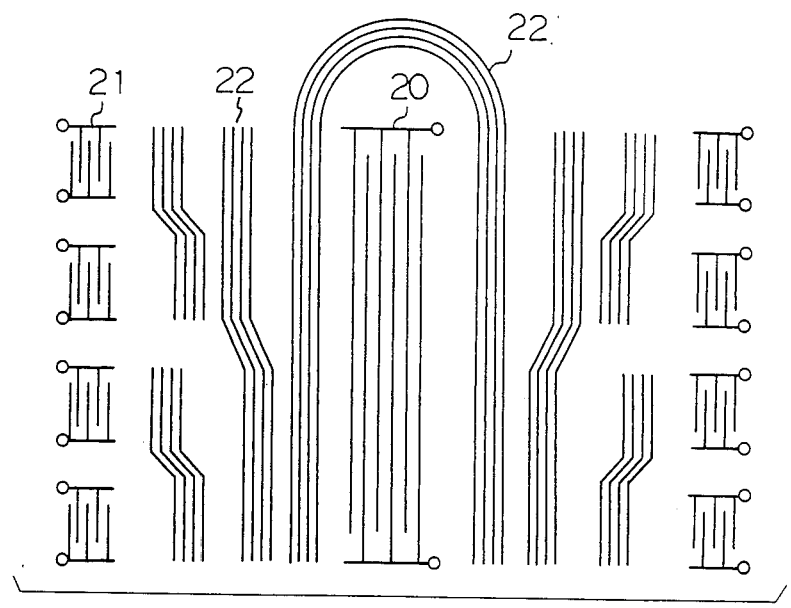
FIGS. 6a through 6d are views showing one embodiment of the filter bank according to the present invention.
Figure 6B:
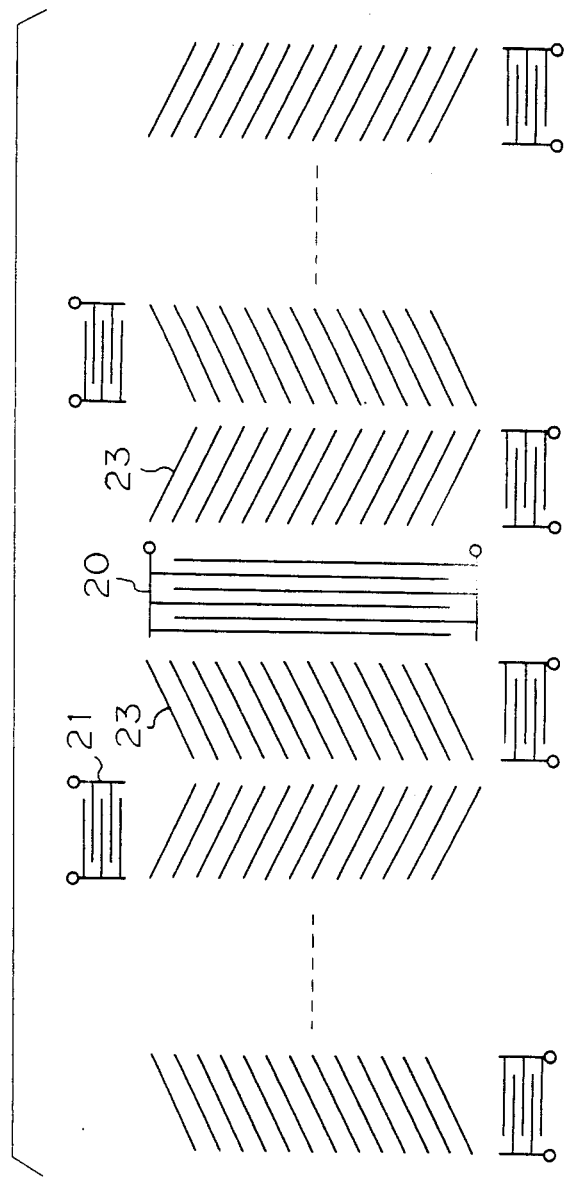
Figure 6C:
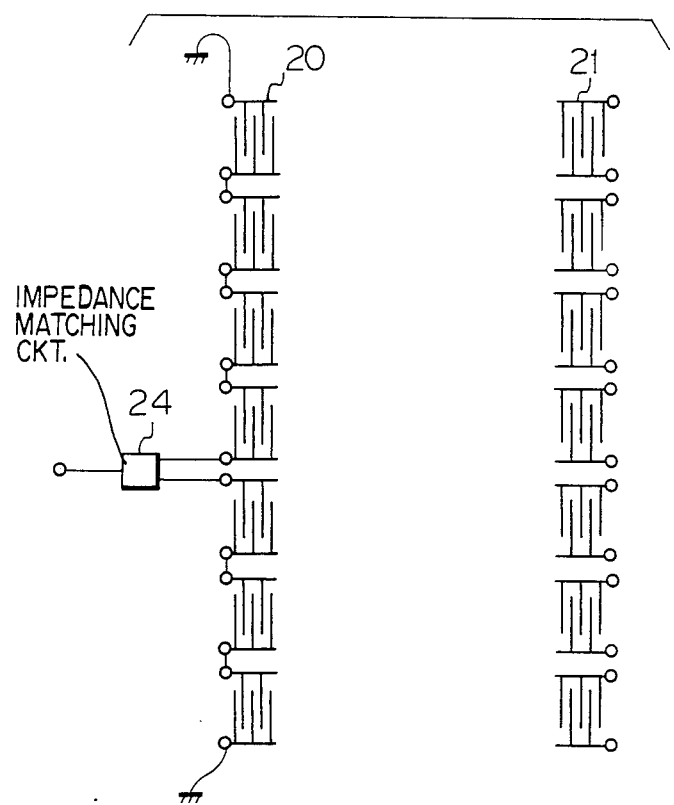
Figure 6:
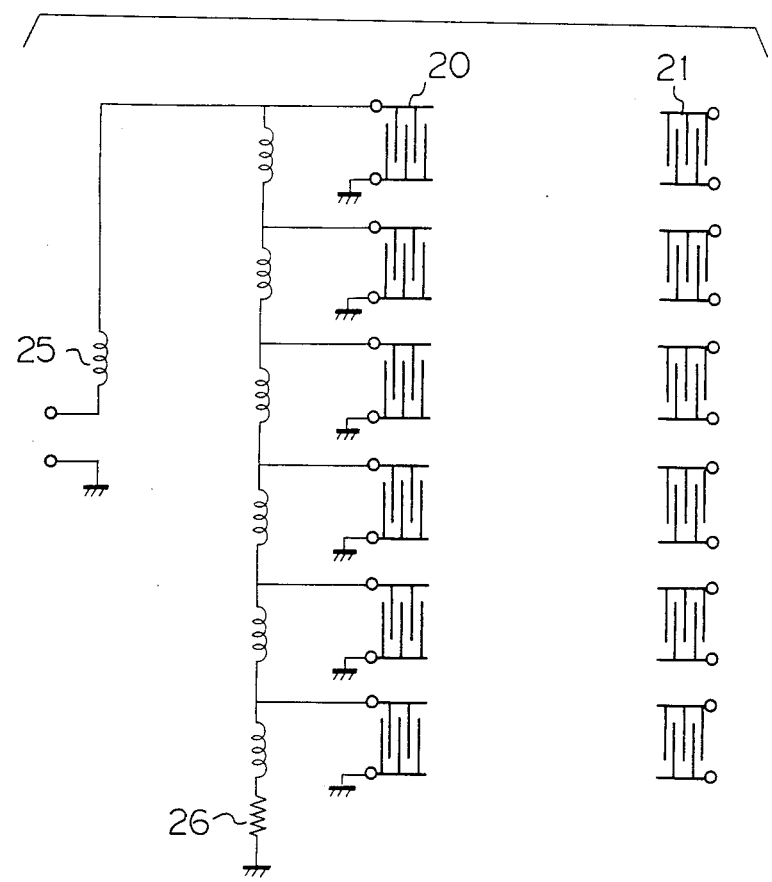

The filter bank 16 employing the surface acoustic wave filters can be realized by, for example, the structure shown in FIG. 6. FIG. 6(a) shows an embodiment of a filter bank using a multistrip coupler wherein Numeral 20 designates an input electrode, Numeral 21 is an output electrode and Numeral 22 designates the multistrip coupler. Further, FIG. 6(b) shows an embodiment of a filter bank using gratings wherein Numeral 20 designates an input electrode, Numeral 21 designates an output electrode and Numeral 23 designates the grating. The grating 23 can be realized in a variety of types including a groove type having grooves in the surface of a piezo-electric substrate, a strip type having a piezo-electric substrate adhered with a metallic thin film and an ion implantation type capable of varying the material constants in the vicinity of the surface of the piezo-electric substrate. FIG. 6(c) shows an embodiment of a filter bank formed by a number of parallelly arranged surface acoustic wave filters wherein Numeral 20 designates an input electrode, Numeral 21 designates an output electrode and Numeral 24 designates an impendance matching circuit. Lastly, FIG. 6(d) also shows an embodiment of a filter bank formed by a number of parallelly arranged surface acoustic wave filters wherein Numeral 20 designates an input electrode, Numeral 21 designates an output electrode, Numeral 25 designates a coil and Numeral 26 designates a resistor.

Thus, the bandwidth-variable filter matrix can be realized in a small size by using the filter banks employing surface acoustic wave filters and the dual gate FET's.

Figure 7A:
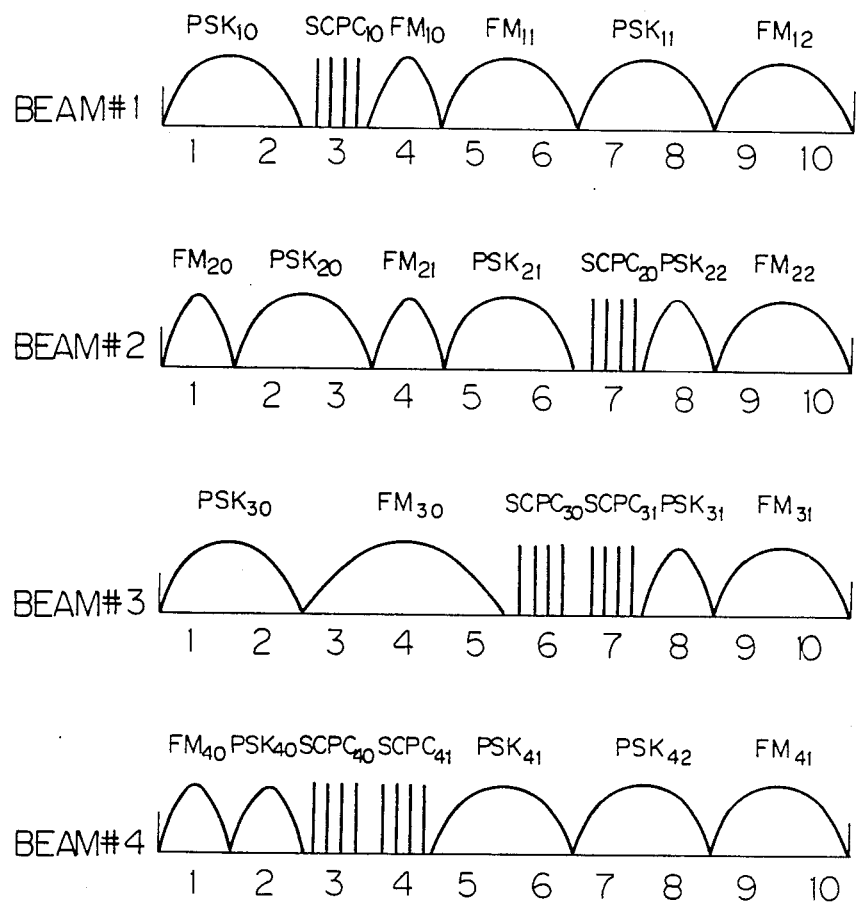
FIGS. 7a and 7b are views showing an example of application of the communication satellite repeater according to the present invention.
Figure 7B:
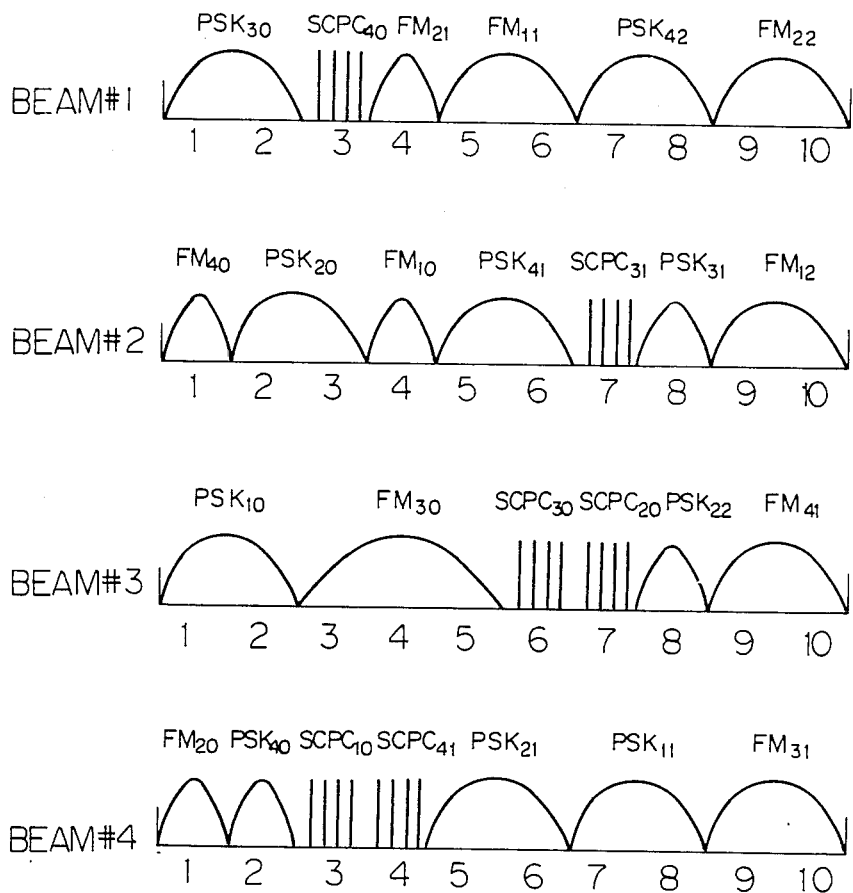
Figures 8A, 8B, 8C, 8D, 8E:
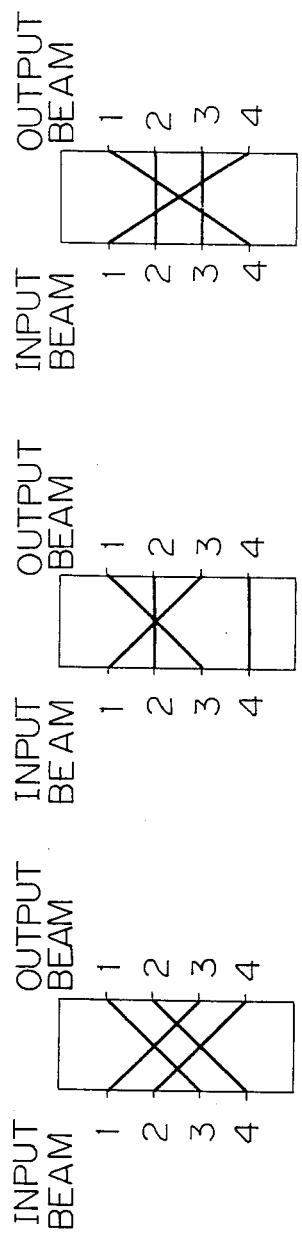
FIGS. 8a through 8j are diagrammatical views showing switching patterns for switches in the bandwidth-variable filter matrix in the application of the communications satellite repeater shown in FIG. 7.
Figure 8H:
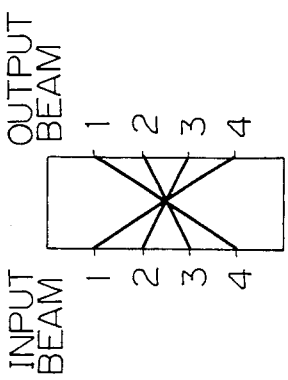
Figure 8G:
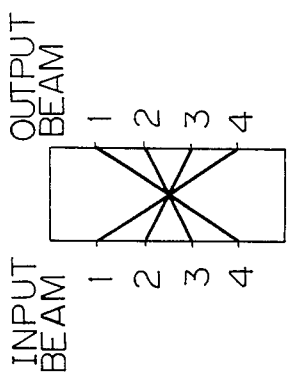
Figure 8J:
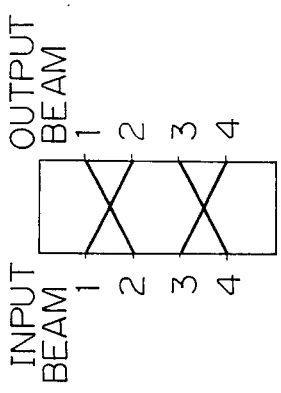
Figure 8F:
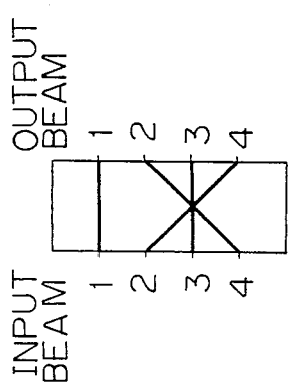
Figure 8I:
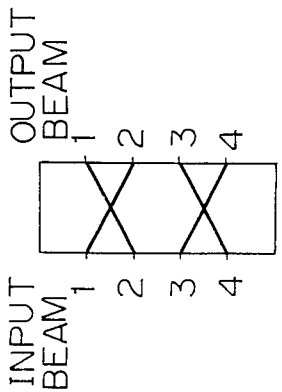

Next, an example of application of the communications satellite repeater of the present invention will be described. Assume that the number of the satellite beams is 4 and each channel is divided into 10 narrow-band channels by the filter bank. FIG. 7 shows an example of application of the communications satellite repeater in which PSK, FM and SCPC signal waves of a variety of bandwidths share one channel by the frequency division multiple access and in which (a) designates the output signal waves of input demultiplexers and (b) designates the input signal waves of output multiplexers. The Numerals 1 through 10 given below the shown signal waves mean or designate narrow-band channels 1 through 10, respectively. The relationship between FIGS. 7(a) and 7(b), in which all combinations of interbeam connections are established within each transponder for various types and bandwidths of signal waves, can be established by setting the switches included in the bandwidth-variable filter matrix in the manner as shown in FIG. 9 wherein symbols (a) through (j) show switching patterns, respectively, of the switches for the narrow-band channels 1 through 10.

With the above structure, each channel is divided into a plurality of narrow-band channels and the interbeam connections are performed on a narrow-band channel by narrow-band channel so that the high degree of interbeam connectivity is accomplished, thereby achieving the object of the present invention.

As described above, according to the present invention, it is possible to realize to multibeam communications satellite which has high degree of interbeam connectivity and which is capable of flexibly accommodating the demands for satellite communications by changing the switching patterns of the switches in the bandwidth-variable filter matrix.

From the foregoing it will now be apparent that a new and improved communications satellite repeater has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A communications satellite repeater for a multibeam satellite in which a satellite communications band for each beam is divided into a plurality of first channels by an input demultiplexer, each first channel having a first bandwidth, wherein each of said first channels are interbeam-connected by a filter matrix, which is operatively connected to output multiplexers and provides outputs thereto, and wherein said filter matrix comprises:

filter banks coupled to the outputs of said input demultiplexers for providing a plurality of second channels by dividing each of said first channels, each second channel having a second bandwidth narrower than said first bandwidth;

switches coupled with said filter banks to inter-beam connect said second channels; and multiplexers for multiplexing the second channels at the output of said switches to provide output channels to said output multiplexers, whereby a plurality of inter-beam connections are established within each first bandwidth.

2. A communications satellite repeater according to claim 1, wherein said filter bank is implemented by using surface acoustic wave filters which have a piezoelectric substrate and interdigital electrodes mounted on said substrate.

3. A communicating satellite repeater according to claim 1, wherein the filter banks are designed such that adjacent ones of said second channels intersect one another at points where the amplitude is attenuated 6 dB and the phase is continuous at these points.

* * * * *